(12) United States Patent
Chen et al.

(10) Patent No.: US 10,442,898 B2
(45) Date of Patent: Oct. 15, 2019

(54) PROCESS FOR PREPARING WATERBORNE HEAT SEAL COATING COMPOSITIONS

(71) Applicant: Dow Global Technologies LLC, Midland, MI (US)

(72) Inventors: Liang Chen, Midland, MI (US); Yinzhong Guo, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/766,205

(22) PCT Filed: Aug. 2, 2016

(86) PCT No.: PCT/US2016/045119
§ 371 (c)(1),
(2) Date: Apr. 5, 2018

(87) PCT Pub. No.: WO2017/062088
PCT Pub. Date: Apr. 13, 2017

(65) Prior Publication Data
US 2018/0282488 A1 Oct. 4, 2018

Related U.S. Application Data

(60) Provisional application No. 62/238,261, filed on Oct. 7, 2015.

(51) Int. Cl.
| | |
|---|---|
| C09D 123/08 | (2006.01) |
| C09J 123/08 | (2006.01) |
| C09J 5/06 | (2006.01) |
| C08J 3/03 | (2006.01) |

(52) U.S. Cl.
CPC ........... *C08J 3/03* (2013.01); *C09D 123/0853* (2013.01); *C09J 123/0853* (2013.01); *C08J 2323/08* (2013.01)

(58) Field of Classification Search
CPC ... C08J 3/03; C08J 2323/08; C09D 123/0853; C09J 123/0853
USPC ......................................................... 524/563
See application file for complete search history.

(56) References Cited

U.S. PATENT DOCUMENTS

| | | | | |
|---|---|---|---|---|
| 3,692,723 | A * | 9/1972 | Kasagi et al. | C08F 10/00 524/155 |
| 4,128,518 | A * | 12/1978 | Oyamada | C08F 218/08 524/501 |
| 4,320,041 | A | 3/1982 | Abe et al. | |
| 5,385,967 | A | 1/1995 | Bauer et al. | |
| 5,688,842 | A | 11/1997 | Pate, III et al. | |
| 6,512,024 | B1 | 1/2003 | Lundgard et al. | |
| 7,189,461 | B2 * | 3/2007 | Rabasco | C08F 210/02 427/331 |
| 2004/0175589 | A1 | | 9/2004 | Rabasco et al. |

(Continued)

*Primary Examiner* — Kelechi C Egwim

(57) ABSTRACT

A process for preparing a waterborne heat seal coating composition comprising the steps of: a) melt blending ethylene vinyl acetate copolymer, at least one tackifier, and optionally a surfactant in a mixing and conveying zone to form a melt blend; b) contacting the melt blend with an initial aqueous stream comprising a neutralizing agent, water, and optionally a surfactant in an emulsification zone to form a dispersion; and c) diluting the dispersion with water in a dilution zone to form the waterborne heat seal coating composition wherein the process is a continuous process, is disclosed.

9 Claims, 1 Drawing Sheet

(56) References Cited

U.S. PATENT DOCUMENTS

2007/0243331 A1 10/2007 Strandburg et al.
2014/0094537 A1 4/2014 Schmidt et al.

* cited by examiner

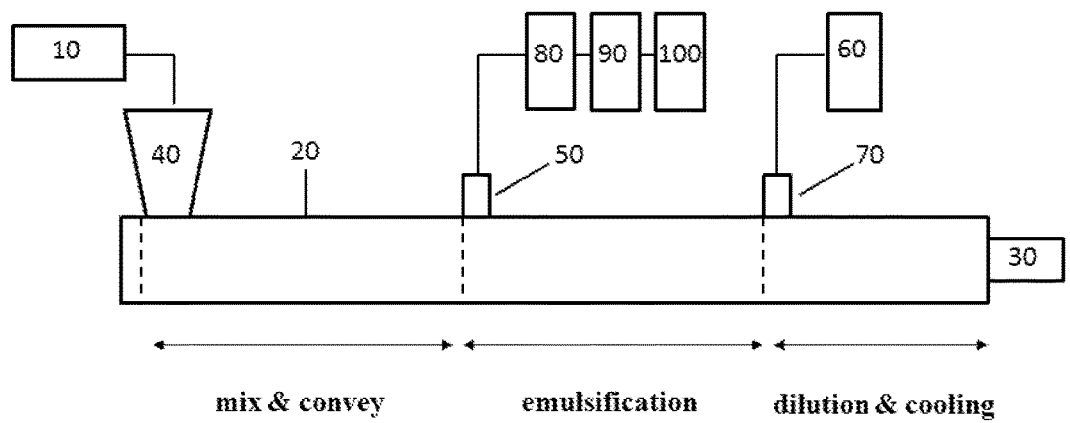

PROCESS FOR PREPARING WATERBORNE HEAT SEAL COATING COMPOSITIONS

REFERENCE TO RELATED APPLICATIONS

The present application claims the benefit of U.S. Provisional Application No. 62/238,261, filed on Oct. 7, 2015.

FIELD OF THE INVENTION

The present invention is related to waterborne heat seal coating compositions.

BACKGROUND

Heat seal coating (HSC) has been used in food, pharmaceutical, medical, and industrial packaging applications. Examples of HSC products include waterborne ethylene vinyl acetate (EVA)-resin-based heat seal coatings (i.e. ADCOTE 37 series, available from The Dow Chemical Company).

Waterborne HSC products are typically manufactured by a batch dispersion process, which has relatively high conversion cost due to long cycle time as well as substantial batch to batch variations. Significant waxes as process aids are required in the batch dispersion process in order to help dispersibility, and they do not contribute to the adhesion properties.

Therefore, a lower-cost process for manufacturing waterborne HSC products while still maintaining or improving quality and HSC performance, is desired. Additionally, the EVA resin is likely to be subject to hydrolysis in the batch dispersion process due to longer processing in a strong base environment at high temperature, so a continuous dispersion process with short residence time is highly desired to significantly mitigate EVA hydrolysis.

SUMMARY OF THE INVENTION

In one broad embodiment of the present invention, there is disclosed a process for preparing a waterborne heat seal coating composition comprising, consisting of, or consisting essentially of the steps of: a) melt blending ethylene vinyl acetate copolymer, at least one tackifier, and optionally a surfactant in a mixing and conveying zone to form a melt blend; b) contacting the melt blend with an initial aqueous stream comprising a neutralizing agent, water, and optionally a surfactant in an emulsification zone to form a dispersion; and c) diluting the dispersion with water in a dilution zone to form the waterborne heat seal coating composition, wherein the process is a continuous process.

BRIEF DESCRIPTION OF THE DRAWINGS

FIG. 1 is a depiction of an extrusion apparatus used to prepare waterborne dispersions.

DETAILED DESCRIPTION OF THE INVENTION

The waterborne HSC composition contains a thermoplastic polymer. A suitable thermoplastic polymer for the present invention is a copolymer of ethylene with at least one ethylenically unsaturated comonomer selected from vinyl esters, acrylic acid, $C_1$-$C_4$ alkyl ester of acrylic acid, $C_1$-$C_4$ alkyl ester of a $C_1$-$C_4$ alkylacrylic acid, and cyclic olefin copolymers and blends thereof. Examples of vinyl esters include vinyl esters of acetic acid, propionic acid, butyric acid, 2-ethylhexane carboxylic acid, pelargonic acid, and stearic acid, particularly $C_2$ to $C_4$-carboxylic acids, and especially vinyl acetate, can be used. Representative examples of copolymers of ethylene and ethylenically unsaturated comonomers include ethylene/vinylacetate copolymer (EVA), ethylene/acrylic acid copolymer (EAA) ethylene/methyl acrylate copolymer (EMA), ethylene/methylmethacrylate copolymer (EMMA), ethylene/methyl acrylate/acrylic acid copolymer (EMAAA), ethylene/methyl acrylate/methacrylic acid copolymer (EMAMAA), ethylene/butyl acrylate/acrylic acid copolymer (EBAAA), and ethylene vinyl acetate styrene copolymers. The polymers can be prepared by bulk, emulsion, or solution polymerization. In various embodiments, the thermoplastic polymer is an ethylene vinyl acetate copolymer. In general, the vinylester content is in the range from 10 to 80 percent, preferably 20 to 45 percent, more preferably 25 to 32 percent, more preferably 28 to 32 percent by weight. Commercially available examples of ethylene vinyl acetate copolymers comprising 2 to 45 percent by weight of vinyl acetate and having a melt viscosity index of 6 to 150 g/10 min, are sold under the name ELVAX™ from DuPont.

The thermoplastic polymer in the waterborne HSC composition is generally present in an amount in the range of from 50 to 85 weight percent, in an amount in the range of from 55 to 80 weight percent in some embodiments, and in an amount in the range of from 60 to 75 weight percent in various other embodiments based on the total weight of the solids in the dispersion.

In some embodiments, the HSC composition can contain at least one wax as an anti-blocking agent. Suitable waxes include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes, fatty acid ester waxes, such as carnauba wax, and fatty amide waxes. It is common in the art to use the terminology "synthetic high melting point waxes" to include high density, low molecular weight polyethylene waxes, by-product polyethylene waxes and Fischer-Tropsch waxes. Other waxes also include those described in U.S. Pat. Nos. 6,335,410; 6,054,544 and 6,723, 810; which are all incorporated herein by reference.

In addition to the thermoplastic resin, dispersions described herein include a dispersing agent. As used here in the term "dispersing agent" means an agent that aids in the formation and/or stabilization of a dispersion. Suitable dispersing agents, sometimes referred to as surfactants, for use in the present invention include both ionic and nonionic surfactants.

Nonionic surfactants are materials in which the polar functionality is not provided by an anionic or cation group, but by a neutral polar group such as typically an alcohol, amine, ether, ester, ketone, or amide function. Typical nonionic surfactants include but are not limited to polyethoxylated alkylphenols such as polyethoxylated p-nonylphenol, p-octylphenol, or p-dodecylphenol; polyethoxylated straight-chain alcohols derived from coconut oil, tallow, or synthetic materials including oleyl derivatives; polyethoxylated polyoxypropylene glycols (block copolymers of ethylene oxide and propylene oxide), typically having molecular weights of 1000 to 30,000; polyethylene glycol; polyethoxylated mercaptans; long-chain carboxylic acid esters including glyceryl and polyglyceryl esters of natural fatty acids, propylene glycol esters, sorbitol esters, polyethoxylated sorbitol esters, polyoxyethylene glycol esters, and polyethoxylated fatty acids; alkanolamine "condensates" e.g. the condensates made by reaction of methyl or triglyceride esters of fatty acids with equimolar or twice equimolar amounts of alkanolamine; tertiary acetylenic glycols; polyethoxylated silicones, prepared by reaction of a reactive silicone intermediate with a capped allyl polyalkylene oxide such as propylene oxide or mixed ethylene oxide/propylene oxide copolymer; N-alkylpyrrolidones, and alkylpolyglycosides (long chain acetals of polysaccharides). Further nonionic surfactants more specifically include ethoxylated coco amide; oleic acid; t-dodecyl mercaptan; modified polyester dispersants; ester, amide, or mixed ester-amide dispersants based on polyisobutenyl succinic anhydride; dispersants based on polyisobutyl phenol; ABA type block copolymer nonionic dispersants; acrylic graft copolymers; octylphenoxypolyethoxyethanol; nonylphenoxypolyethoxyethanol; alkyl aryl ethers; alkyl aryl polyethers; amine polyglycol condensates; modified polyethoxy adducts; modified terminated alkyl aryl ethers; modified polyethoxylated straight chain alcohols; terminated ethoxylates of linear primary alcohols; high molecular weight tertiary amines such as 1-hydroxyethyl-2-alkyl imidazolines; oxazolines; perfluoralkyl sulfonates; sorbitan fatty acid esters; polyethylene glycol esters; aliphatic and aromatic phosphate esters. Also included are the reaction products of hydrocarbyl-substituted succinic acylating agents and amines.

Typical ionic surfactants include oleic acid, fatty acid, dimer fatty acid, alkyl solfonic acid, alkyl substituted aromatic solfonic acid, alkyl phosphorus acid, and combinations thereof neutralized with an aqueous base. The surfactant can be added to the extruder at any point in the extruder prior to the dilution and cooling zone.

The surfactant in the waterborne dispersion composition is generally present in an amount in the range of from 0.1 to 5 weight percent, in an amount in the range of from 0.2 to 2.5 weight percent in some embodiments, and in an amount in the range of from 0.5 to 1.5 weight percent in various other embodiments based on the total weight of the solids in the dispersion.

The surfactant may be partially or fully neutralized with a neutralizing agent. In certain embodiments, neutralization of the stabilizing agent, such as a long chain fatty acid, may be from 25 to 200 percent on a molar basis; or in the alternative, it may be from 50 to 110 percent on a molar basis. For example, for a fatty acid, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may be an organic amine, for example, an amine such as monoethanolamine, or 2-amino-2-methyl-1-propanol (AMP) Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

The neutralizing agent in the waterborne dispersion composition is generally present in an amount in to provide a degree of neutralization to the composition in the range of from 20% to 200%, in the range of from 20% to 150% in some embodiments, and in an amount in the range of from 25% to 70% percent in various other embodiments based on the total moles of acid of the composition.

The HSC composition also contains a tackifier. Any suitable tackifier can be used. Examples of tackifiers include, but are not limited to rosin acid, rosin esters, terpene phenolics, pure monomer resins, and phenolic resins or their mixtures. The tackifiers can be natural products or synthetic products.

The tackifier in the waterborne dispersion composition is generally present in an amount in the range of from 5 to 30 weight percent, in an amount in the range of from 6 to 20 weight percent in some embodiments, and in an amount in the range of from 10 to 15 weight percent in various other embodiments based on the total weight of the solids in the dispersion.

The HSC composition generally comprises greater than 40 weight percent water, and greater than 50 weight percent water in various other embodiments.

The HSC composition may contain other additives including but not limited to defoamers, rheology modifiers, wetting agents, and organic or inorganic pigments.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. The melt-kneading may be conducted under the conditions which are typically used for melt-kneading the thermoplastic resin. A process for producing the dispersions in accordance with the present invention is not particularly limited. One process, for example, is a process comprising melt-kneading the thermoplastic polymer, surfactant, and any other additives according to U.S. Pat. Nos. 5,756,659; 7,763,676; and 7,935,755. In various embodiments, a melt-kneading machine is, for example, a multi screw extruder having two or more screws, to which a kneading block can be added at any position of the screws. If desired, it is allowable that the extruder is provided with at least two material-supplying inlets from the upper stream to the down stream along the flow direction of a material to be kneaded. Further, if desired, a vacuum vent may be added at an optional position of the extruder. In some embodiments, the waterborne dispersion the thermoplastic polymer, surfactant, tackifier and any other additives is first diluted to contain about 10 to about 20 percent by weight of water and then subsequently further diluted to comprise greater than 40 percent by weight of water. In some embodiments, the further dilution provides a dispersion with at least about 50 percent by weight of water.

FIG. 1 schematically illustrates an extrusion apparatus which can be used in the process of the present invention. An extruder 20, preferably a twin screw extruder, is coupled to a back pressure regulator, melt pump, or gear pump, 30. In various embodiments, the extruder has three zones: a mix and convey zone, an emulsification zone, and a dilution and cooling zone. In various embodiments, the mix and convey zone is operated at a temperature in the range of from 140 to 160° C. and the emulsification zone is operated at a temperature in the range of from 80 to 120° C.

Thermoplastic EVA, in the form of pellets, powder, or flakes, and a tackifier are fed from a feeder 10 to an inlet 40 of the extruder 20 where the components are melted or compounded to form a melt blend. In some embodiments, the surfactant is added to the resin through an opening along with the resin and in other embodiments, the surfactant is provided separately to the twin screw extruder 20. Other additives can also be added to the extruder via inlet 40. The melt blend is then delivered from the mix and convey zone to an emulsification zone of the extruder where the initial amount of water, and a neutralizing agent is added through inlet 50. In some embodiments, there can be a base reservoir 80 and an initial water reservoir 90, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater. In some embodiments, a surfactant can be added to inlet 50 from surfactant reservoir 100.

The emulsified mixture is further diluted with additional water from reservoir 60 via inlet 70 to the dilution and cooling zone of the extruder. Typically, the dispersion is diluted to at least 40 weight percent water in the cooling zone. In various embodiments, the dispersion is diluted to 40 to 80 weight percent water. In addition, the diluted mixture may be diluted any number of times until the desired dilution level is achieved.

In various embodiments, a homogeneous blend of EVA resin, tackifier, and surfactant (if present) is achieved prior to emulsification. For example, a high shear rate (screw speed) can be used to achieve uniform particle size distribution. These components can be pre-compounded prior to the emulsification process. Also, in various embodiments, a heat exchanger is used to cool the waterborne dispersion to <80° C. after the dispersion exits the extruder.

The melt kneading product comprises polymer particles having a volume average particle size from 150 nm to 2000 nm dispersed in water. All values and subranges from 150 nm to 2000 nm are included herein and disclosed herein. The pH of the dispersion is typically 8-11.

The described waterborne HSC compositions can be used for food packaging heat sealing, medical device packaging, medicine packaging, and industrial packaging.

Examples

An waterborne HSC composition was prepared using a KWP (Krupp Werner & Pfleiderer Corp. (Ramsey, N.J.) ZSK25 extruder (25 mm screw diameter, 60 L/D rotating at 450 rpm) according to the following procedure. The extruder had a total of 3 zones: melt blending in the mix & convey zone, an emulsification zone, and a dilution and cooling zone. Elvax® 4260 (ethylene vinyl acetate from DuPont), Dymerex™ rosin (from Eastman), Carnauba wax (from Gehring-Motgomery), and Paraffin waxes (Paraffin Wax 128/130 and paraffin wax 140/145 (1:1 by weight) from Ross Waxes) were fed into the KWP extruder by means of loss-in-weight feeders separately. Oleic acid was injected into the emulsification zone through a single tappet style injector. Dual 500 ml ISCO syringe pumps metered the initial aqueous (IA) stream of DI water and KOH solution (30 wt %), which was pumped into the emulsification zone of the twin-screw extruder though the same single tappet style injector. Before starting the dispersion run, the extruder barrel and exit zones were heated to the desired temperatures (mix zone=150° C., emulsification and dilution zones=100° C.). Once the extruder barrel reached the desired temperature, polymer was purged through the extruder. To prevent plugging, the screw was operated at about 300 rpm until the residual polymer from the previous run exited the end valve freely. The polymer feed was then started and the polymer flow was allowed to line out.

The Examples prepared and their properties are shown in Table 1, below. E/D/C/P/O stands for Elvax® 4260/Dymerex™/Carnauba wax/Paraffin/Oleic acid. DoN signifies the degree of total acids neutralized with KOH aqueous solution. Comparative Example B was Adcote 37P295 from the Dow Chemical Company, and was made by a batch dispersion process. Comparative Example A had excess DoN and was made by a continuous process using an extruder.

Particle size analysis was conducted in the Beckman Coulter LS 13 320 Laser Diffraction Particle Size Analyzer (Beckman Coulter Inc.) using the standard procedure pre-determined by the instrument software. Dispersion pH was measured using a Denver Instruments pH meter. Solids content analysis was performed with an Ohaus MB45 moisture analyzer. Dispersion viscosity was measured on a Brookfield rotational viscometer (RV #3 spindle at 100 rpm).

TABLE 1

| Example | Example 1 | Example 2 | Example 3 | Comparative A | Comparative B |
|---|---|---|---|---|---|
| Composition | E/D/C/P/O[a] 233/47/60/60/2.4 DoN = 53% | E/D/C/P/O 233/47/30/30/2.0 DoN = 66% | E/D/C/P/O 233/47/30/60/2.2 DoN = 53% | E/D/C/P/O 233/47/60/60/2.4 DoN = 100% | DoN = 100% |
| Particle Size Average (um) | 0.350 | 0.284 | 0.345 | 24.3 | 0.196 |
| Particle Size Mode (um) | 0.358 | 0.326 | 0.326 | 34.6 | 0.205 |
| pH | 9.55 | 10.29 | 9.63 | 11.5 | 10.2 |
| Viscosity 1 minute(100 | 105.0 | 222.0 | 252.0 | Not measurable, dispersion | 54 |

TABLE 1-continued

| Example | Example 1 | Example 2 | Example 3 | Comparative A | Comparative B |
|---|---|---|---|---|---|
| RPM RV03) | | | | formed a hard gel after cooling to room temperature | |
| % solids | 39.65 | 43.62 | 43.15 | 45.6 | 40.3 |

Examples 1-3 showed significantly less hydrolysis of EVA polymer, resulting in better bonding strength and also showed less color. In addition, Examples 1-3 showed improved shelf stability (at 50° C.>12 weeks), as compared with the batch product, Comparative Example B (1 week at 50° C.)

Performance Tests:
- Primer substrate: 92 g PET, Pre-laminated PET-Aluminum foil side
- Seal to Second substrate: 92 g PET, casted PP (3 mils), PVC sheet, PETG sheet, Barex sheet (yellow), Paper board (clay coated one side), Pre-laminated PET-Aluminum foil side.
- The HSC samples for the performance tests were prepared by coating waterborne HSC samples with a Mayer rod drawdown bar by targeting the dried coating weight 3 lb/ream. The coated wet films were dried in 90° C. oven for 2 min to evaporate water.
- Heat sealing was conducted with a heat sealer with upside heating temperature for the bond strength test: 40 psi, 1.0 sec, different temperature (200° F.-350° F.)
- Heat sealing was conducted with a heat sealer with upside heating temperature for the activation temperature evaluation: 40 psi, 0.5 sec, 77-200° F.
- Block resistance: 1# weight, room temperature and 40° C.
- Bond strength was measured with a Thwing Albert Instron: 1-inch strip, 10 inch/min pulling speed, triplicates samples report average value (g/in)

Coating weight is summarized in Table 2, below.

TABLE 2

| Sample | Coated PET (lbs/ream) | Coated Foil (lbs/ream) |
|---|---|---|
| Comparative Example B | 3.0 | 2.8 |
| Example 1 | 3.2 | 2.9 |
| Example 2 | 3.2 | 3.2 |
| Example 3 | 2.9 | 2.9 |

Bond Strength is summarized in Tables 3-6.

TABLE 3

Coated PET Seal to PVC (Mean Value, g/in)

| | Heat seal temperature | | | | | |
|---|---|---|---|---|---|---|
| | 200° F. | 225° F. | 250° F. | 275° F. | 300° F. | 350° F. |
| Comparative example B | 157 | 240 | 334 | 235 | 368 | 666 |
| Example 1 | 484 | 489 | 528 | 487 | 558 | 628 |
| Example 2 | 780 | 729 | 749 | 622 | 706 | 715 |
| Example 3 | 439 | 444 | 487 | 452 | 396 | 527 |

TABLE 4

Coated PET Seal to Yellow Barex (Mean Value, g/in)

| | Heat seal temperature | | | | | |
|---|---|---|---|---|---|---|
| | 200° F. | 225° F. | 250° F. | 275° F. | 300° F. | 350° F. |
| Comparative example B | 215 | 117 | 60 | 171 | 271 | 296 |
| Example 1 | 268 | 556 | 547 | 577 | 528 | 530 |
| Example 2 | 261 | 525 | 665 | 653 | 749 | 786 |
| Example 3 | 475 | 449 | 471 | 474 | | 462 |

TABLE 5

Coated PET Seal to White Paper Board (Mean Value, g/in)

| | Heat seal temperature | | | | | |
|---|---|---|---|---|---|---|
| | 200° F. | 225° F. | 250° F. | 275° F. | 300° F. | 350° F. |
| Comparative example B | 49 | 84 | 70 | 87 | 67 | 62 |
| Example 1 | 60 | 68 | 65 | 89 | 99 | 154 |
| Example 2 | 93 | 93 | 98 | 89 | 115 | 126 |
| Example 3 | 95 | 111 | 111 | 114 | 112 | 142 |

TABLE 6

Coated Foil Seal to PET (Mean Value, g/in)

| | Heat seal temperature | | | | | |
|---|---|---|---|---|---|---|
| | 200° F. | 225° F. | 250° F. | 275° F. | 300° F. | 350° F. |
| Comparative example B | 127 | 56 | 144 | 127 | 273 | 347 |
| Example 1 | 417 | 394 | 459 | 485 | 474 | 506 |
| Example 2 | 73 | 139 | 264 | 207 | 327 | 495 |
| Example 3 | 264 | 417 | 468 | 325 | 418 | 405 |

To test shelf stability, the samples were kept at 4° C. (in a refrigerator) and at 50° C. (in an oven) respectively for 1-12 weeks. These results are shown in Table 7.

TABLE 7

| | 50° C. shelf stability* | 4° C. shelf stability* |
|---|---|---|
| Comparative example B | 2 weeks | >12 weeks |
| Example 1 | >12 weeks | >12 weeks |
| Example 2 | >12 weeks | >12 weeks |
| Example 3 | >12 weeks | >12 weeks |

*no precipitation and minimal particle size and viscosity change

What is claimed is:

1. A process for preparing a waterborne heat seal coating composition comprising the steps of:

a) melt blending ethylene vinyl acetate copolymer, at least one tackifier, and optionally a surfactant in a mixing and conveying zone to form a melt blend;
b) contacting the melt blend with an initial aqueous stream comprising a neutralizing agent, water, and optionally a surfactant in an emulsification zone to form a dispersion; and
c) diluting the dispersion with water in a dilution zone to form the waterborne heat seal coating composition wherein the process is a continuous process.

2. The process of claim 1, wherein the process is performed in an extruder.

3. The process of claim 1, wherein a wax is also added to the ethylene vinyl acetate copolymer, tackifier, and optional surfactant to form the melt blend of step a).

4. The process of claim 1, wherein the mixing and conveying zone is operated at a temperature in the range of from 140 to 160° C. and the emulsification zone is operated at a temperature in the range of from 80 to 120° C.

5. The process of claim 1, wherein the neutralizing agent is potassium hydroxide.

6. The process of claim 1, wherein the waterborne heat seal coating composition has a degree of neutralization of acid groups in the range of from 25 mole percent to 70 mole percent, based on the total acid content of the waterborne heat seal coating composition.

7. The process of claim 1, wherein the waterborne heat seal coating composition comprises from 40 weight percent to 80 weight percent water.

8. The process of claim 1, wherein the ethylene vinyl acetate is present in an amount in the range of from 50 to 85 weight percent, and the tackifier is present in an amount in the range of from 6 to 20 weight percent based on the total weight of the solids in the waterborne heat seal coating composition.

9. A waterborne heat seal coating composition produced by the process of claim 1.

* * * * *